Oct. 8, 1929.  W. H. BOSWORTH  1,730,992
WAGON LOADER
Filed July 20, 1927  2 Sheets-Sheet 1
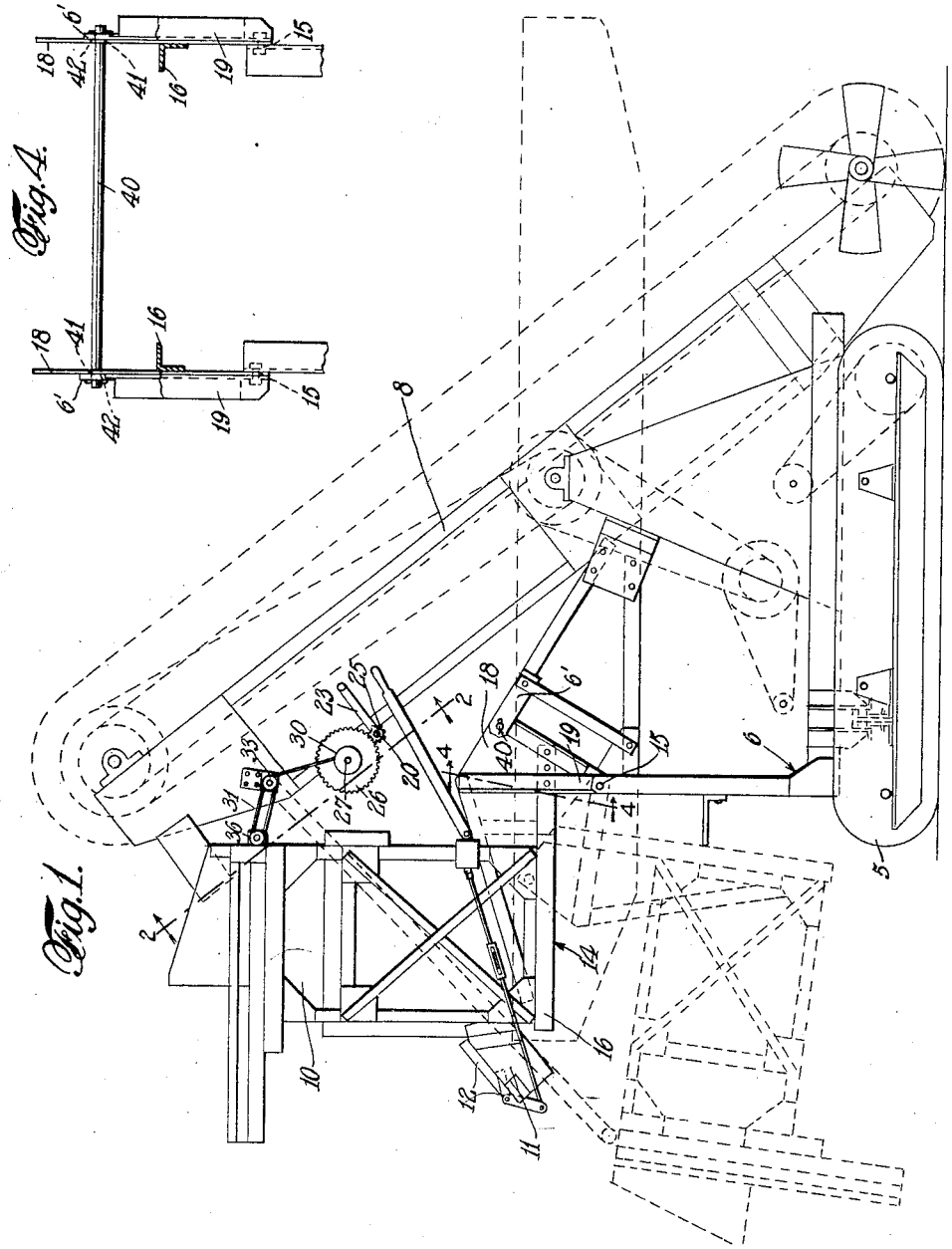
INVENTOR
W. H. Bosworth
BY
Williams & Cross
ATTORNEY Oct. 8, 1929.  W. H. BOSWORTH  1,730,992
WAGON LOADER
Filed July 20, 1927  2 Sheets-Sheet 2
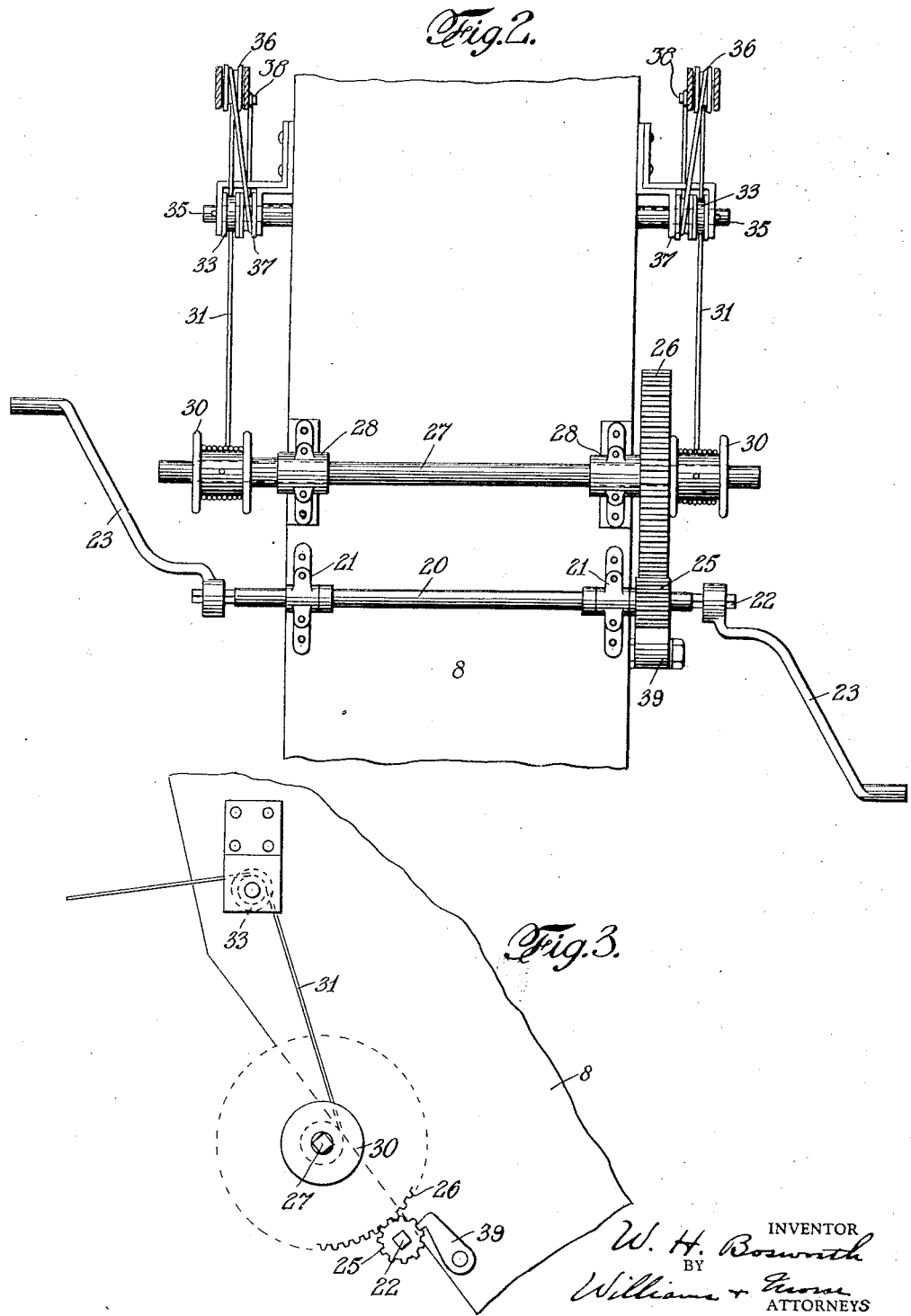

Patented Oct. 8, 1929

1,730,992

UNITED STATES PATENT OFFICE

WILLIAM H. BOSWORTH, OF YONKERS, NEW YORK, ASSIGNOR TO GEORGE HAISS MANUFACTURING COMPANY, OF NEW YORK, N. Y., A CORPORATION OF NEW YORK

WAGON LOADER

Application filed July 20, 1927. Serial No. 207,066.

This invention relates to wagon loaders of the type characterized by an inclined conveyor adapted to elevate material so that it may be conveniently loaded into a wagon or other vehicle. In such wagon loaders, the inclined conveyor is often pivotally mounted upon the supporting frame so that the conveyor may be moved from its inclined to a substantially horizontal position while the loader is being moved from place to place under comparatively low overhead structures such as culvers, bridges, trestles, and the like.

The general object of the present invention is to provide a wagon loader of this general type with a hopper adapted to receive and temporarily retain material elevated by the conveyor, and arranged so that it may readily be moved out of the way of the conveyor when it is necessary to move the latter from its inclined to its lowered or horizintal position.

The invention will be understood from the following description, taken in connection with the accompanying drawings, in which, Figure 1 is a side elevation of a wagon loader embodying the invention, the hopper and conveyor being shown in full lines in their respective elevated positions and in dash lines in their respective lowered positions; Figure 2 is a sectional view taken on the line 2—2 of Figure 1, showing in detail the raising and lowering mechanism for the hopper; Figure 3 is a detail view showing the raising and lowering mechanism, as viewed from the right in Figure 2, with the operating handle removed; and Figure 4 is a sectional view taken on the line 4—4 of Figure 1.

The wagon loader herein shown includes a traction mechanism 5 of the endless track type, upon which is mounted a main frame 6, to which is pivotally connected an endless conveyor 8, which includes the usual conveyor frame and is adapted to be moved (through the instrumentality of suitable means not shown) from its full line position, shown in Figure 1, to its dash line position shown therein. During the operation of the loader, the conveyor 8 is positioned as shown in full lines in Figure 1, but when it is desired to transport the loader from place to place, the conveyor is moved about its point of connection with the frame 6 to its dash line position. Immediately below and in proximity to the delivery end of the conveyor 8 is arranged a hopper 10 which is adapted to receive material from the conveyor to be thereafter loaded into a wagon, truck or other vehicle, the material being directed from the hopper through a chute 11, the passage of which may be opened and closed by suitable gate mechanism 12. The hopper 10 is mounted upon a suitable supporting frame 14, pivotally connected to the frame 6, as shown at 15. The frame 14, upon which the hopper 10 is mounted, includes a pair of side members 16 which are connected to a pair of side plates or gussets 18, suitably reinforced or strengthened by angle-irons 19 and pivotally connected to the frame 6, as shown at 15.

By reason of the fact that the hopper 10 is mounted upon the frame 14 which is pivotally connected to the frame 6, as shown at 15, the hopper 10 and frame 14 may be lowered to their respective dash line positions, shown in Figure 1, out of the immediate vicinity of the discharge end of the conveyor 8, thus permitting the conveyor to be moved to its dash line position, shown in Figure 1, with the result that the over-all height of the loader is materially reduced so as to enable it to pass under such overhead obstructions as culverts, bridges, trestles and the like.

The hopper 10 together with the frame 14 is raised and lowered by suitable winch mechanism carried by the conveyor 8 and shown in detail in Figures 2 and 3. This winch mechanism includes a transverse shaft 20 journaled in suitable bearings 21 mounted upon the conveyor 8, the shaft 20 being provided at opposite ends with square portions 22 adapted for the reception of removable handles 23, by which the winch mechanism may be manually operated. One end of the shaft 20 carries a pinion 25, which meshes with a larger gear 26 secured to a transverse shaft 27 journaled in suitable bearings 28 mounted on the frame of the conveyor 8.

Upon opposite ends of the shaft 27 are mounted drums 30, to which are anchored the ends of cables 31 which are wound up on said drums when raising the hopper 10 with its frame 14. These cables 31 pass respectively over pulleys 33 rotatably mounted upon trunnions 35 suitably secured to and projecting from opposite sides of the conveyor 8. The cables 31 pass from the pulleys 33 over pulleys 36 suitably connected to the hopper 10, and thence over pulleys 37, journaled upon the trunnions 35 adjacent the pulleys 33, and back to the hopper to which their dead ends are suitably anchored, as shown at 38.

By the winch mechanism above described, the hopper 10 with its frame 14 may be readily raised and lowered by operating the shaft 20 in proper directions, as will be readily understood. In order, however, to lock the hopper 10 and frame 14 in any one of the positions to which they may be moved, a suitable pawl 39 may be provided, the pawl 39 being pivotally connected to one side of the conveyor 8 and adapted to engage the pinion 25, as shown most clearly in Figure 3. This pawl 39 may be readily lifted out of engagement with the pinion 35, when it is desired to operate the winch mechanism, and moved into engagement with such pinion when it is desired to lock the conveyor in any given position. However, it may be desired to more rigidly lock the hopper 10 in its full line position, shown in Figure 1, than would be possible with the pawl 39, and to this end a removable rod 40, shown most clearly in Figure 4, may be provided. This rod is adapted to be passed through openings 41 and 42 provided respectively in the gussets 18 and the side members 6' of the frame 6, the rod being adapted for the reception of cotter-pins at its outer ends, as shown, whereby the rod is withheld against accidental displacement. The rod 40 affords a substantially rigid connection between the hopper 10 and the frame 6, when the hopper is in its full line position shown in Figure 1, thereby relieving the winch mechanism of any excessive strain due to the accumulation of material in the hopper as such material is received from the conveyor 8 and also permitting the conveyor 8 to be moved or adjusted about its pivotal connection with the frame 6 independently of and without disturbing the position of the hopper 10. However, the rod 40 is such that it may be readily removed when it is desired to lower the hopper 10 through the instrumentality of the winch mechanism.

It will be understood that changes and modifications may be made in the construction shown and above particularly described, without departing from the spirit of the invention as defined in the following claims.

What is claimed is:

1. In a wagon loader, a conveyor adapted to operate in an inclined position and adapted to be moved to an inoperative position, a hopper located below the discharge end of said conveyor and adapted to receive material therefrom, and means for adjustably supporting said hopper with respect to the delivery end of said conveyor, and a winch mechanism carried by said conveyor and cooperating with said hopper for lowering said hopper out of the path of the discharge end of said conveyor when said conveyor is moved to its inoperative position.

2. In a wagon loader, a conveyor adapted to operate in an inclined position and adapted to be moved to an inoperative position, a hopper located below the discharge end of said conveyor and adapted to receive material therefrom, and means for adjustably supporting said hopper with respect to the delivery end of said conveyor, and a winch mechanism carried by said conveyor and cooperating with said hopper for lowering said hopper out of the path of the discharge end of said conveyor when said conveyor is moved to its inoperative position, and means for rigidly retaining said hopper in its uppermost position with respect to the discharge end of said conveyor.

3. In a wagon loader, a frame, a conveyor pivotally mounted on said frame and movable from an inclined to a substantially horizontal position, a hopper adapted to receive material from the delivery end of said conveyor when it is in its inclined position, said hopper being pivotally connected to said frame and movable independently of said conveyor, and means connecting said conveyor and said hopper for moving the latter into and out of cooperative relation with the delivery end of said conveyor.

4. In a wagon loader, a frame, a conveyor pivotally mounted on said frame and movable from an inclined to a substantially horizontal position, a hopper adapted to receive material from the delivery end of said conveyor when it is in its inclined position, said hopper being pivotally connected to said frame and movable independently of said conveyor, means connecting said conveyor and said hopper for moving the latter into and out of cooperative relation with the delivery end of said conveyor, and means for locking said hopper in cooperative relation to the discharge end of said conveyor.

5. In a wagon loader, a main frame, a supporting frame pivotally connected to said main frame, a hopper mounted upon said supporting frame and adapted to be raised and lowered about the pivotal connection of said supporting frame with said main frame, means for retaining said hopper in its raised position, and a conveyor including a conveyor frame pivotally connected to said main frame, said conveyor being adjustable independently of said hopper when said hopper is in its raised position and adapted to deliver material thereto.

6. In a wagon loader, a main frame, a supporting frame pivotally connected to said main frame, a hopper mounted upon said supporting frame and adapted to be raised and lowered about the pivotal connection of said supporting frame with said main frame, means for retaining said hopper in its raised position, a conveyor including a conveyor frame pivotally connected to said main frame, said conveyor being adjustable independently of said hopper when said hopper is in its raised position and adapted to deliver material thereto, and means for raising and lowering said hopper with respect to and independently of the delivery end of said conveyor.

7. In a wagon loader, a main frame, a supporting frame connected to said main frame, a hopper pivotally mounted upon said supporting frame and adapted to be raised and lowered about the pivotal connection of said supporting frame with said main frame, releasable means for rigidly locking said hopper in its raised position, a conveyor pivotally connected to said main frame, said conveyor being adjustable independently of said hopper when said hopper is in its raised position and adapted to deliver material thereto, and a winch mechanism cooperating with said hopper for raising and lowering the same with respect to and independently of the delivery end of said conveyor.

In testimony whereof, I have affixed my signature to this specification.

WILLIAM H. BOSWORTH.